US010587298B1

(12) United States Patent
Yan et al.

(10) Patent No.: US 10,587,298 B1
(45) Date of Patent: Mar. 10, 2020

(54) TRANSMISSION THROTTLING FOR EMISSION EXPOSURE MANAGEMENT

(71) Applicant: QUALCOMM Incorporated, San Diego, CA (US)

(72) Inventors: Hongbo Yan, Vista, CA (US); Junsheng Han, Sunnyvale, CA (US); Raghu Narayan Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/117,352

(22) Filed: Aug. 30, 2018

(51) Int. Cl.
H04B 1/3827 (2015.01)
H04L 1/00 (2006.01)
H04L 1/18 (2006.01)
H04W 52/26 (2009.01)
H04W 28/06 (2009.01)
H04W 52/22 (2009.01)
H04W 52/24 (2009.01)

(52) U.S. Cl.
CPC ......... H04B 1/3838 (2013.01); H04L 1/0002 (2013.01); H04L 1/1812 (2013.01); H04L 1/1867 (2013.01); H04W 28/06 (2013.01); H04W 52/225 (2013.01); H04W 52/246 (2013.01); H04W 52/267 (2013.01)

(58) Field of Classification Search
CPC ... H04B 1/3838; H04L 1/1867; H04L 1/1812; H04L 1/0002; H04W 52/246; H04W 52/225; H04W 52/267; H04W 28/06
See application file for complete search history.

(56) References Cited

U.S. PATENT DOCUMENTS

2011/0273999 A1* 11/2011 Nagaraja ............ H04B 7/15557
370/252
2011/0276851 A1* 11/2011 Nagaraja ............... H04L 1/1607
714/748
2011/0300849 A1* 12/2011 Chan ..................... H04L 1/1867
455/422.1
2014/0141789 A1* 5/2014 Tarokh .................. H04W 72/02
455/450
2014/0226571 A1* 8/2014 Das ..................... H04L 41/0896
370/329
2015/0382362 A1* 12/2015 Park ..................... H04W 72/082
370/330

(Continued)

Primary Examiner — Lewis G West
(74) Attorney, Agent, or Firm — Norton Rose Fulbright LLP

(57) ABSTRACT

Techniques for providing transmission throttling for emission exposure management are described. Embodiments implement duty cycle based transmission throttling for emission exposure management. Transmission throttling implemented in accordance with embodiments drops or skips transmission of some portion of transmission blocks of a communication process, such as to drop some transmission blocks providing retransmission of data. Transmit power levels utilized with respect to each of transmission blocks transmitted may be closer to that of a transmit power control target level (e.g., meeting the TPC target level) while nevertheless meeting an emission exposure limit level. Embodiments may, for example, be implemented with respect to a hybrid automatic repeat request (HARQ) process. Other aspects and features are also claimed and described.

21 Claims, 7 Drawing Sheets

(56) References Cited

U.S. PATENT DOCUMENTS

| | | | |
|---|---|---|---|
| 2016/0100423 A1* | 4/2016 | Pengoria | H04B 7/024 370/329 |
| 2016/0150507 A1* | 5/2016 | Kim | H04W 72/04 455/450 |
| 2016/0192420 A1* | 6/2016 | Kim | H04W 74/00 370/329 |
| 2016/0239057 A1* | 8/2016 | Kocagoez | G06F 1/206 |
| 2017/0317791 A1* | 11/2017 | Wiberg | H04L 1/1825 |
| 2018/0167171 A1* | 6/2018 | Wu | H04L 1/18 |
| 2018/0227882 A1* | 8/2018 | Freda | H04W 8/005 |
| 2018/0294927 A1* | 10/2018 | Takeda | H04L 1/1861 |
| 2018/0368169 A1* | 12/2018 | Jung | H04W 72/1289 |
| 2019/0191461 A1* | 6/2019 | Lee | H04W 4/40 |

\* cited by examiner

TRANSMISSION THROTTLING FOR EMISSION EXPOSURE MANAGEMENT

TECHNICAL FIELD

Aspects of the present disclosure relate generally to wireless communication systems, and more particularly, to wireless communication emission exposure management. Certain embodiments of the technology discussed below can enable and provide transmission throttling for emission exposure management.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. These networks, which are usually multiple access networks, can support communications for multiple users by sharing available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Various techniques have been utilized to facilitate wireless communications in environments where interference and other factors, such as fading associated with device mobility, may otherwise result in degraded performance, failed communication links, etc. For example, power control techniques, such as transmit power control (TPC), may be implemented to address issues resulting from propagation loss and interference. Although increasing the transmit power level may facilitate improved signal characteristics (e.g., receive signal strength, signal to interference and noise ratio (SINR), bit error rate (BER), etc.), there are typically emission exposure limitations imposed with respect to user exposure to signals transmitted by a UE. Emission exposure limitations may, for example, be a specific absorption rate (SAR) limit or maximum permissible exposure (MPE) limit set by a governmental body or other authority in a jurisdictions where wireless communication devices are utilized.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of transmission throttling for emission exposure management in wireless communication is disclosed. A method embodiment can includes monitoring a time averaged power level of transmission of the plurality of transmission blocks in an emission exposure rolling average window. Embodiments of the method can further include implementing transmit throttling of transmission blocks based at least in part on the monitored time averaged power level for transmit power control configuration level transmission. Transmit throttling of transmission blocks may include skipping one or more retransmissions of transmission blocks of a same hybrid automatic repeat request (HARQ) process. Emission exposure management logic of one or more processor-based wireless communication devices can be used for monitoring and implementing method embodiments. The logic can be carried out by various hardware and/or software configurations as discussed below.

In an additional aspect of the disclosure, an apparatus configured for transmission throttling for emission exposure management in wireless communication is disclosed. An apparatus embodiment can include means for monitoring a time averaged power level of transmission of the plurality of transmission blocks in an emission exposure rolling average window. Embodiments of the apparatus can further include means for implementing transmit throttling of transmission blocks based at least in part on the monitored time averaged power level for transmit power control configuration level transmission. Transmit throttling of transmission blocks may include skipping one or more retransmissions of transmission blocks of a same hybrid automatic repeat request (HARQ) process. Means for monitoring and implementing of an apparatus embodiment can comprise emission exposure management logic of one or more processor-based wireless communication devices. The logic can be carried out and/or implemented by various hardware and/or software configurations as discussed below.

In an additional aspect of the disclosure, a non-transitory computer-readable medium having program code recorded thereon for transmission throttling for emission exposure management in wireless communication is disclosed. A program code embodiment can include code to monitor a time averaged power level of transmission of the plurality of transmission blocks in an emission exposure rolling average window. Embodiments of the program code can further include code to implement transmit throttling of transmission blocks based at least in part on the monitored time averaged power level for transmit power control configuration level transmission. Transmit throttling of transmission blocks may include skipping one or more retransmissions of transmission blocks of a same hybrid automatic repeat request (HARQ) process. Emission exposure management logic of one or more processor-based wireless communication devices can comprise program code, including program code to monitor and implement, for transmission throttling for emission exposure management of embodiments. The logic can be carried out and/or implemented by various hardware and/or software configurations as discussed below.

In an additional aspect of the disclosure, an apparatus configured for throttling for emission exposure management in wireless communication is disclosed. An apparatus can include at least one processor, and a memory coupled to the processor. A processor of an apparatus embodiment can be configured to monitor a time averaged power level of transmission of the plurality of transmission blocks in an emission exposure rolling average window. Embodiments of the processor can further be configured to implement transmit throttling of transmission blocks based at least in part on the monitored time averaged power level for transmit power control configuration level transmission. Transmit throttling of transmission blocks can include skipping one or more retransmissions of transmission blocks of a same hybrid automatic repeat request (HARQ) process. Emission exposure management logic of one or more processor-based wireless communication devices can comprise a processor configured for emission exposure management, including being configured to monitor and implement, of embodiments. The logic can be carried out and/or implemented by various hardware and/or software configurations as discussed below.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
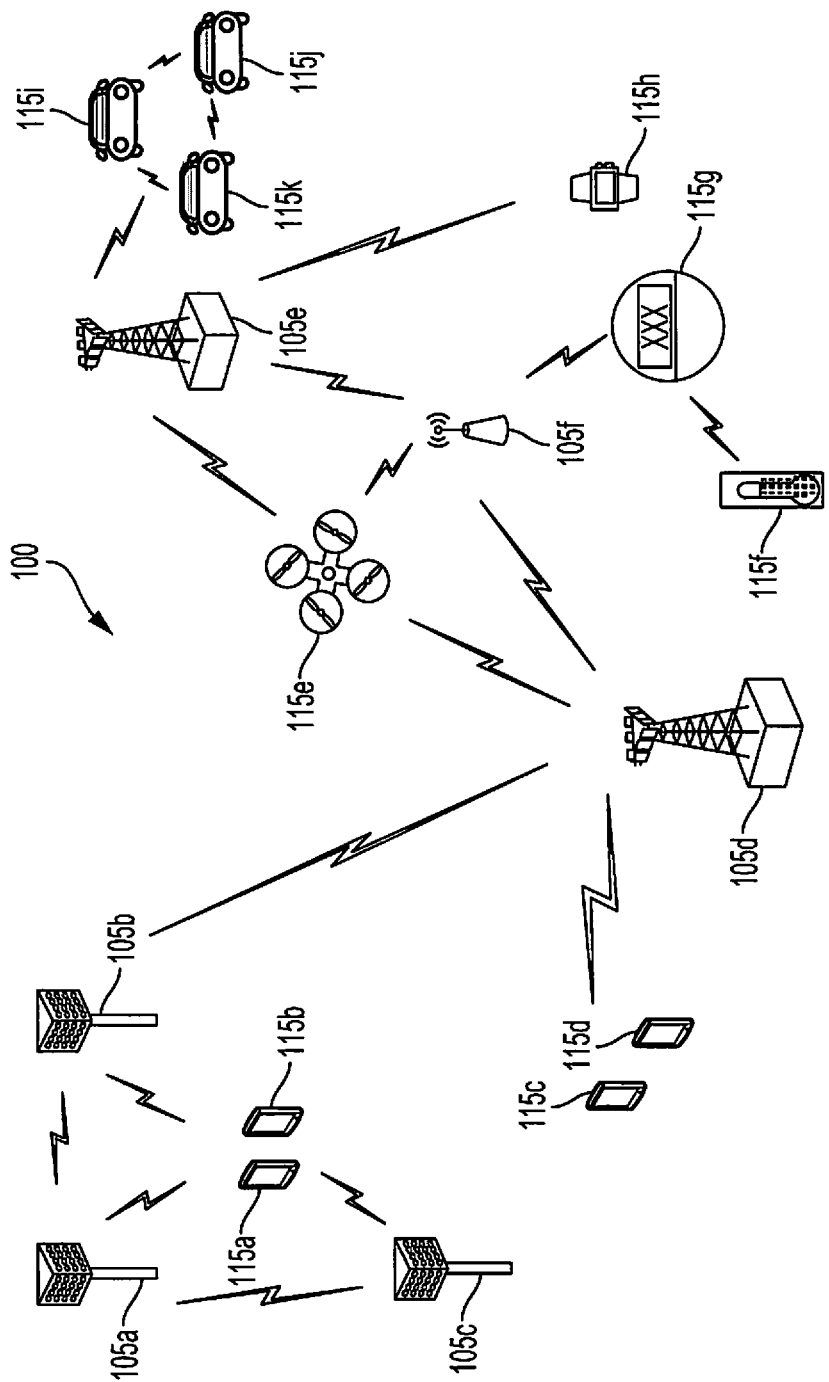
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node 13 (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
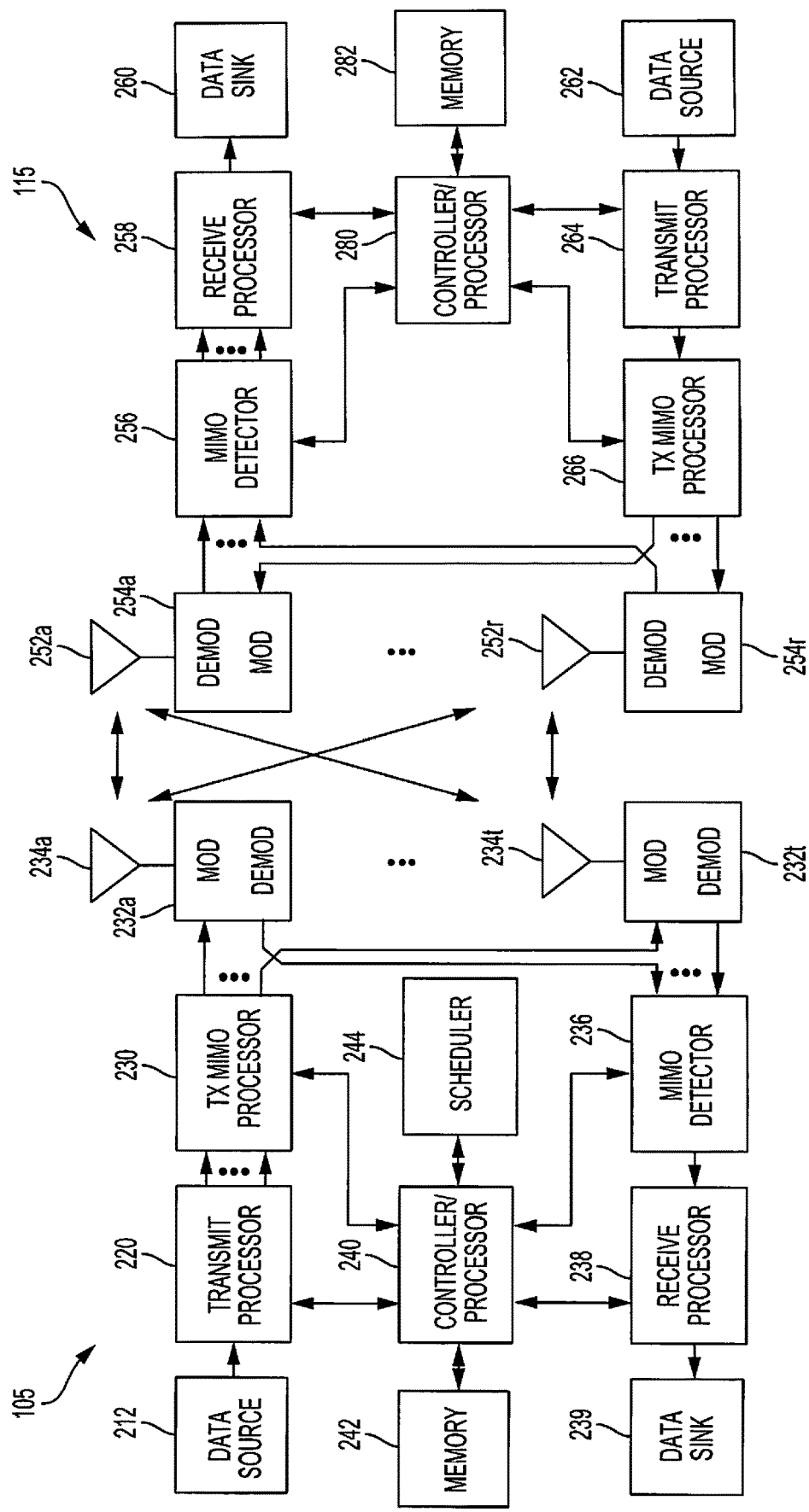
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 4 and 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Various techniques may be utilized with respect to one or more devices (e.g., any or all of base stations 105 and/or UEs 115 of FIGS. 1 and 2) to facilitate communications in a wireless communication network environment, such as to mitigate effects of interference, fading, etc. For example, data retransmission techniques, such as hybrid automatic repeat request (HARQ), may be utilized to retry data transmission one or more times where a signal transmitting the data is not initially received or received such that data is not reliably or fully recoverable. Additionally, or alternatively, power control techniques, such as transmit power control (TPC), may be utilized to facilitate improved received signal characteristics (e.g., receive signal strength, signal to interference and noise ratio (SINR), bit error rate (BER), etc.) in wireless communication links. For example, a UE transmit power level may be adjusted by the network, such as by means of TPC, to provide a target transmit power level to achieve satisfactory uplink performance.

Figure 3A:
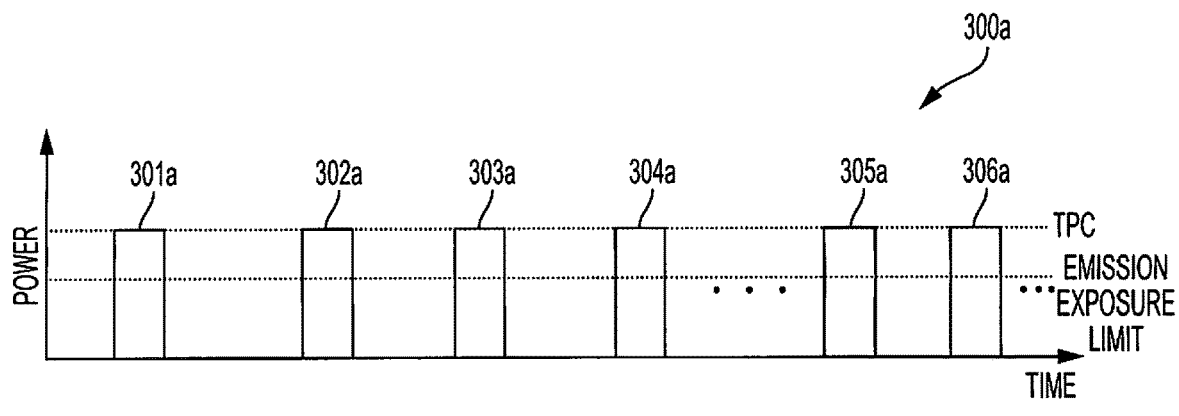
FIGS. 3A and 3B are transmission flow diagrams of wireless communication between devices in a wireless communication network environment.

FIG. 3A illustrates wireless communication between devices (e.g., base station 105 and UE 115) implementing one or more techniques to facilitate communications in a wireless communication network environment. Transmission blocks 301a-306a of transmission flow 300a shown in FIG. 3A illustrate data transmission signals for one or more wireless communication resource parts (e.g., one or more individual communication processes) allocated to the transmitting device (e.g., UE 115) over time. For example, transmission blocks 301a-306a may comprise the data transmission signals of time resources (e.g., TDD resource blocks) allocated to one of UEs 115 for uplink communication with a corresponding one of base stations 105.

As can be seen in the example of FIG. 3A, the transmit power level used with respect to transmission blocks 301a-306a is controlled to correspond to a transmit power control (TPC) target. For example, base station 105 in communication with UE 115 may determine a transmit power level (e.g., based upon channel conditions, presences of interference, received signal attributes, etc.) for UE 115 transmissions and provide a TPC message to the UE for implementing control of the signal transmit power to facilitate reliable wireless communications. Thereafter, UE 115 may operate to transmit transmission blocks 301a-306a at the TPC target level indicated by base station 105 until such time as a TPC message is provided having a different TPC target level or other control of the transmit power level is otherwise provided (e.g., through operation of emission exposure management of embodiments of the present disclosure, as described below).

Transmission flow 300a of FIG. 3A may implement one or more techniques to facilitate communications in a wireless communication network environment in addition to the aforementioned signal transmit power control. For example, a data retransmission technique, such as HARQ, may be implemented with respect to transmission flow 300a (e.g., transmission flow 300a may comprise HARQ transmission blocks corresponding to one or more HARQ processes). HARQ processes can include instances when particular data transmissions are retried by UE 115 one or more times where a signal transmitting the data is not initially received or received such that data is not reliably or fully recoverable by base station 105. Accordingly, some or all of transmission blocks 301a-306a of flow 300a may comprise retransmission blocks for transmission blocks previously transmitted by UE 115.

Although utilization of these techniques may facilitate communications in the wireless network environment, they may nevertheless be associated with undesired or unacceptable effects. For example, utilizing increased transmit power levels by a UE to facilitate improved received signal characteristics at a corresponding base station generally results in an increase in the emission energy impinging on a user of the UE. The retransmission of transmission blocks increases effective emission energy impinging on the user with respect to the data throughput realized.

There may be emission exposure limitations imposed with respect to user exposure to signals transmitted by a device (e.g., UE 115). Such emission exposure limitations may, for example, be a specific absorption rate (SAR) limit or maximum permissible exposure (MPE) limit set by a governmental body or other authority in a jurisdiction in which particular wireless communication devices are utilized. Additionally, or alternatively, a device manufacturer, network operator, standards body, etc. may establish one or more emission exposure limitations. Irrespective of the particular emission exposure limitation imposed, instances of increased transmit power may result in operation of a UE exceeding such emission exposure limitations.

Figure 3B:
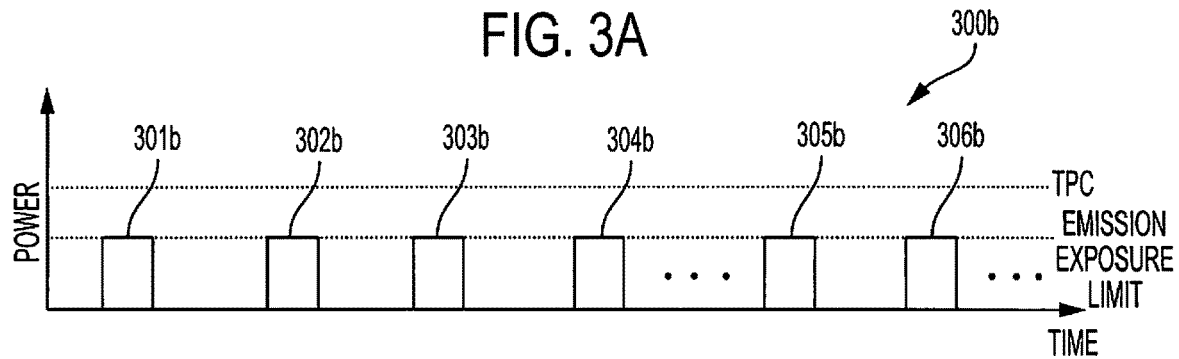

In operation according to prior techniques, when a UE exceeds an emission exposure limit, such as a SAR or MPE limit, the transmit power level is reduced to within the emission exposure limit. For example, as shown in FIG. 3B, the transmit power level utilized with respect to each of transmission blocks 301b-306b of transmission flow 300b (e.g., transmission signals for each particular wireless communication resource part for individual communication processes, such as HARQ processes) is reduced to an emission exposure limit level. Although implementation of such a transmit power level reduction may facilitate operation of the UE to meet an emission exposure limitation, such a technique presents a poor solution from the power-performance trade-off perspective. Moreover, such power backoff techniques are often less responsive with respect to the power level backoff needed to meet a particular emission exposure limit. For example, a UE may rely on the base station to provide for power backoff control by adjusting the UE buffer status report (BSR). However, continuous PUSCH grants can still happen with small buffer size reports. Moreover, the use of such BSR based control involves cross-layer (e.g., the physical layer and the media access control (MAC) layer) coordination and is prone to latency and implementation error.

In operation, the transmit power control selected for UE transmission (e.g., the TPC level shown in FIGS. 3A and 3B) provides a target transmit power level to achieve satisfactory uplink performance. Accordingly, backing off the transmit power as shown in transmission flow 300b may result in unsatisfactory uplink performance (e.g., reduced receive signal strength, reduced SINR, increased BER, data loss, etc.). With transmit power backoff in a system implementing a data retransmission technique, such as HARQ, increased occurrences of retransmission usually follows suit. It should be appreciated, however, that for a single such reduced power transmission, power amplifier efficiency is typically already low (e.g., power amplifier efficiency less than 50%). A first retransmission further reduces the effective power amplifier efficiency with respect to the data throughput realized (e.g., power amplifier efficiency less than 25%). Likewise, a second retransmission still further reduces the effective power amplifier efficiency with respect to the data throughput realized (e.g., power amplifier efficiency less than 20%).

Embodiments of the present disclosure enable and provide transmission throttling for management of emission exposure (e.g., management with respect to emission exposure level limits for SAR, MPE, a device manufacturer, a network operator, a standards body, etc.). In operation, emission exposure management through transmission throttling according to embodiments mitigates transmit power backoff so that wasted energy due to retransmission is reduced or minimized.

Figure 4:
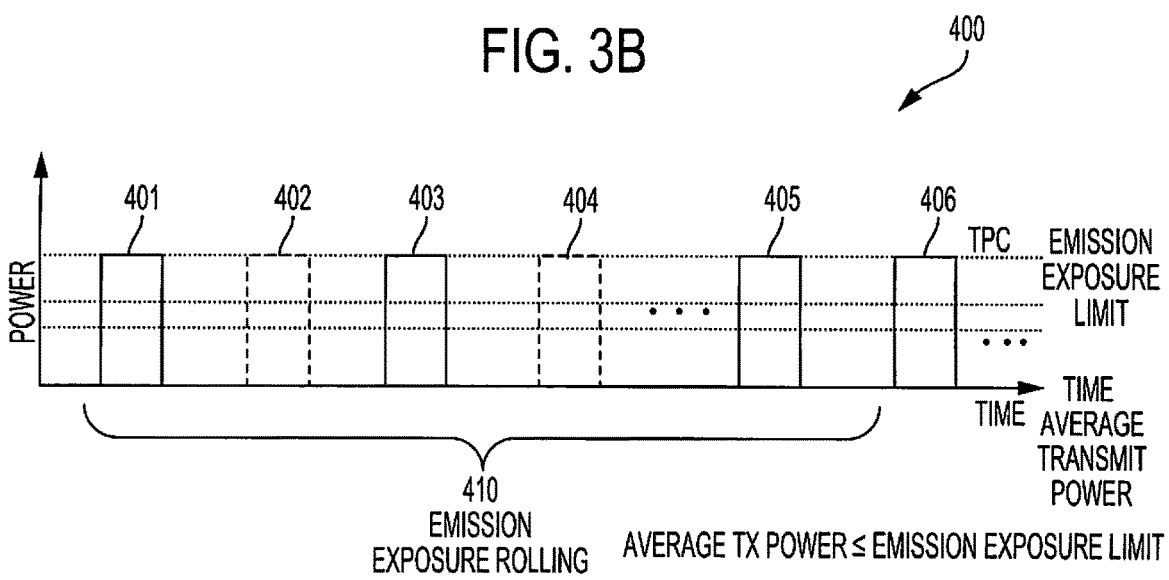
FIG. 4 is a transmission flow diagram of wireless communication between devices in a wireless communication network environment according to some embodiments of the present disclosure.

FIG. 4 illustrates wireless communication between devices (e.g., base station 105 and UE 115) implementing emission exposure management through transmission throttling according to embodiments. As will be better understood from the description that follows, transmission throttling implemented in transmission flow 400 of FIG. 4 drops or skips transmission (i.e., does not transmit) of some portion of transmission blocks 401-406 (e.g., some transmission blocks providing retransmission of data, such as in operation of a HARQ data retransmission technique). Transmit power levels utilized with respect to each of transmission blocks transmitted may be closer to that of the TPC target level (e.g., meeting the TPC target level) while nevertheless meeting an emission exposure limit level.

Emission exposure levels may, for example, be tested using time-averaged (e.g., over a rolling average window) transmit power. For example, emission exposure levels may be determined using emission exposure rolling average window 410 shown in FIG. 4. As illustrated, emission exposure rolling average window 410 moves right with passage of time to encompass a sliding or rolling group of the transmission blocks in the transmission flow. In operation according to embodiments, if a UE does not transmit some portion of the transmission blocks, the UE may transmit at higher transmit power levels during other transmission occasions. That is, although the transmit power level utilized with respect to the transmission blocks transmitted by the UE might otherwise cause an emission exposure limit to be exceeded, the time averaged (e.g., averaged over emission exposure rolling average window 410) transmit power of the transmission blocks actually transmitted by the UE when implementing an embodiment of transmission throttling for emission exposure management is controlled to meet or fall below the requisite emission exposure limit. Moreover, the transmit power level implemented using transmission throttling for emission exposure management as illustrated in FIG. 4 lowers the possibility of additional or excessive retransmissions as compared to the transmit power level reduction technique of FIG. 3B.

Figure 5:
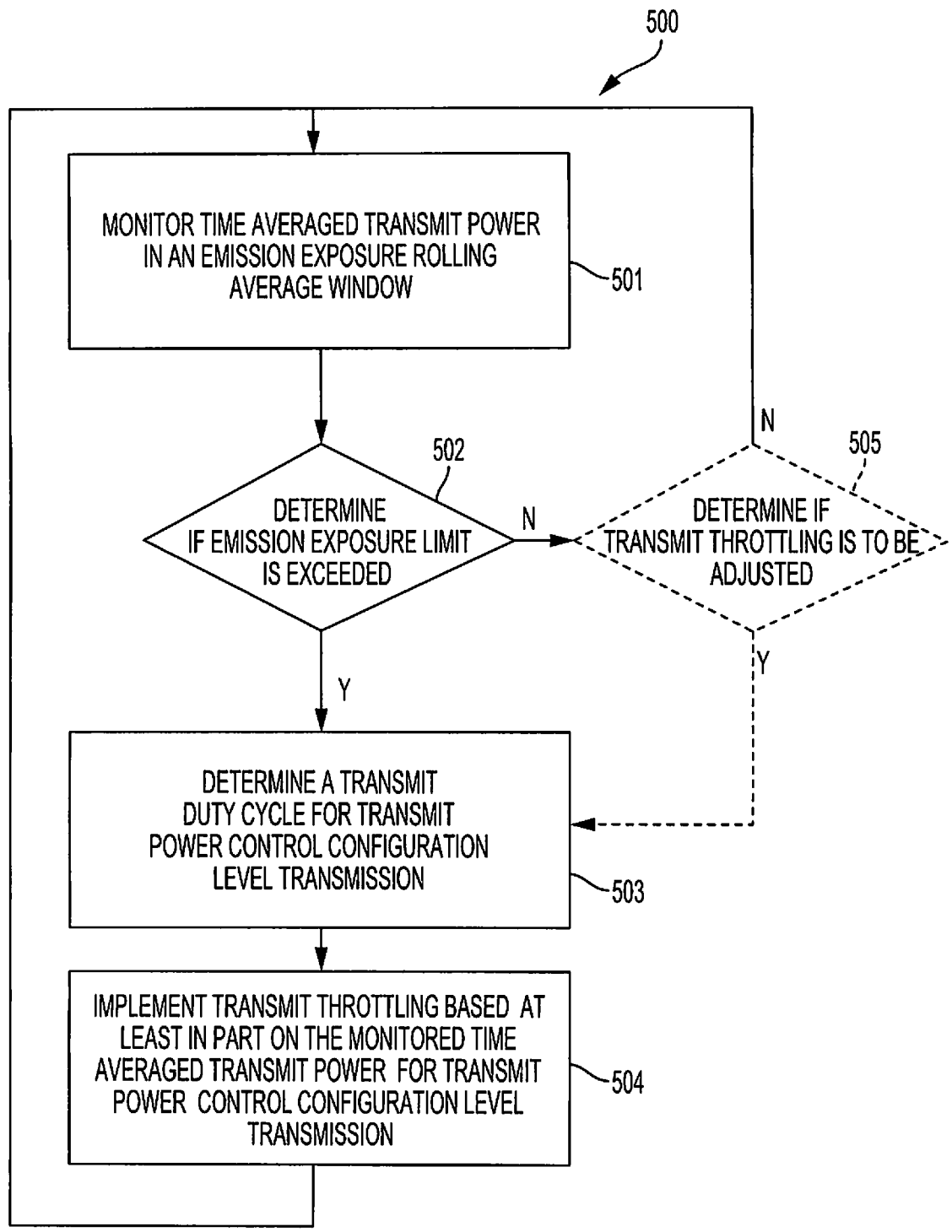
FIGS. 5 and 6 are flow diagrams showing operation of transmission throttling for emission exposure management according to some embodiments of the present disclosure.
Figure 6:
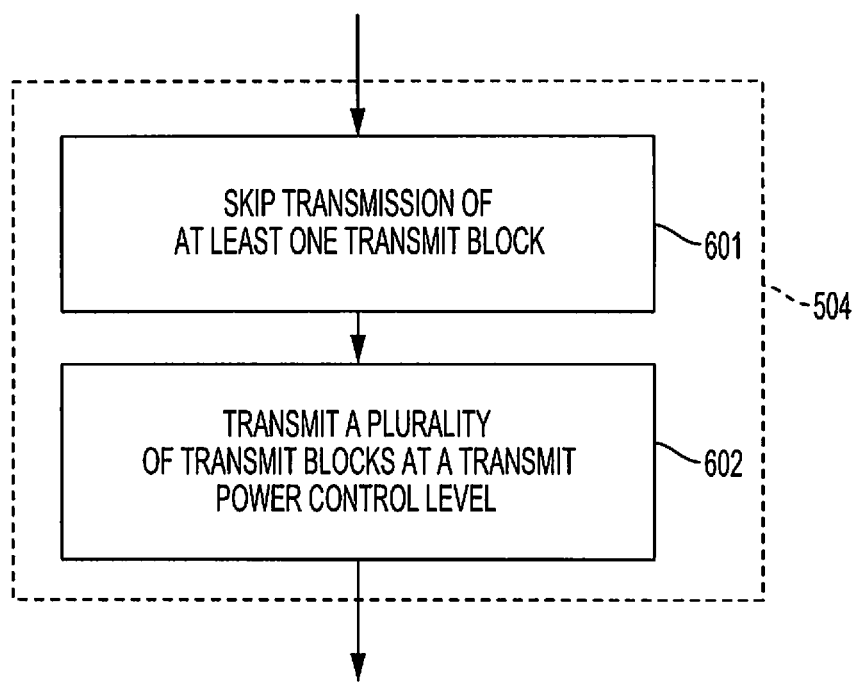

FIGS. 5 and 6 show flow diagrams illustrating operation in accordance with some embodiments of the present disclosure. In particular, FIG. 5 shows a flow diagram illustrating operation of transmission throttling for emission exposure management according to embodiments of the present disclosure. FIG. 6 shows implementation of transmit throttling in accordance with some embodiments. The example blocks of the flows shown in FIGS. 5 and 6 are described below with respect to UE 115 as illustrated in FIG. 7 and base station 105 as illustrated in FIG. 8.

Figure 7:
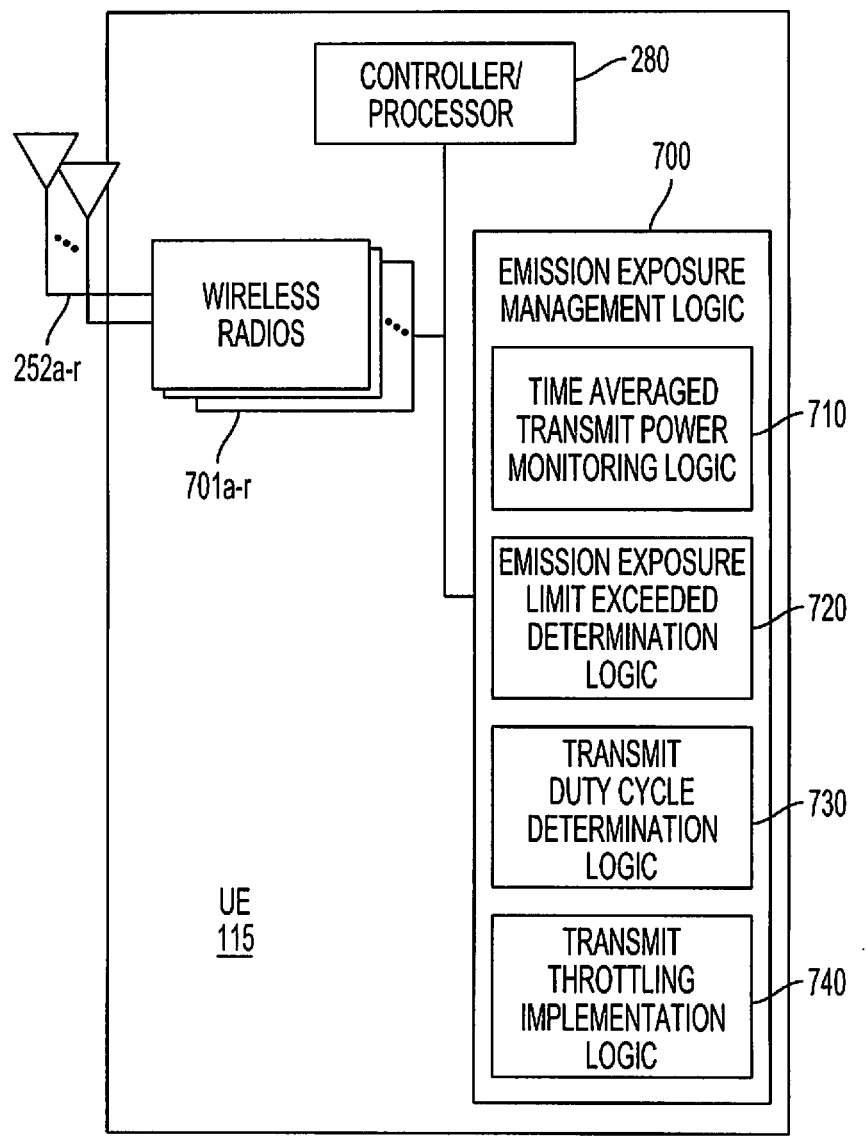
FIG. 7 is a block diagram conceptually illustrating a design of a UE configured to implement transmission throttling for emission exposure management according to some embodiments of the present disclosure.

FIG. 7 is a block diagram illustrating UE 115 configured to implement transmission throttling for emission exposure management according to one aspect of the present disclosure. UE 115 includes structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r include various components and hardware, as illustrated in FIG. 2 for UE 115, including modulator/demodulators 254a-r, MIMO detector 256, receive processor 258, transmit processor 264, and TX MIMO processor 266.

Figure 8:
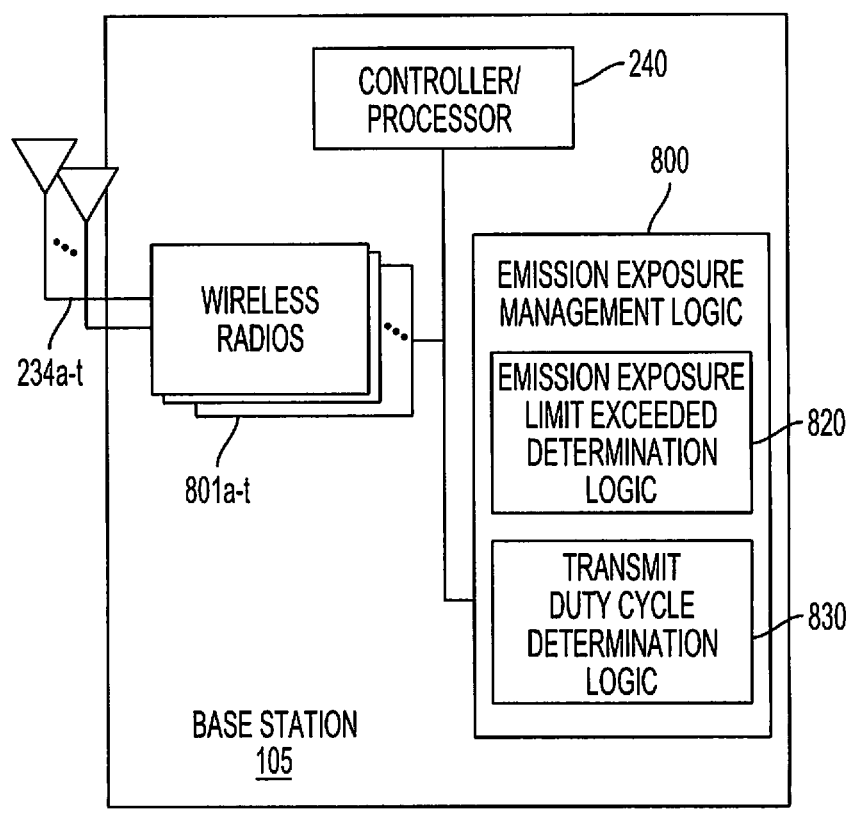
FIG. 8 is a block diagram conceptually illustrating a design of a base station configured to control transmission throttling for emission exposure management according to some embodiments of the present disclosure.

FIG. 8 is a block diagram illustrating base station 105 configured to control transmission throttling for emission exposure management according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801a-t and antennas 234a-t. Wireless radios 801a-t include various components and hardware, as illustrated in FIG. 2 for base station 105, including modulator/demodulators 232a-t, MIMO detector 236, receive processor 238, transmit processor 220, and TX MIMO processor 230.

Referring again to FIG. 5, in operation according to flow 500, emission exposure management logic operates to monitor time averaged transmit power in an emission exposure rolling average window (e.g., emission exposure rolling average window 410) at block 501. In some embodiments, the emission exposure management logic may be one or more instruction set stored in memory 282 and executed by controller/processor 280 of UE 115 (e.g., emission exposure management logic 700 of FIG. 7) and/or stored in memory 242 and executed by controller/processor 240 of base station 105 (e.g., emission exposure management logic 800 of FIG. 8). In other embodiments, a controller or other control module can be used to monitor and control emission exposure as discussed herein.

The transmission throttling techniques discussed in this disclosure can be implemented in a variety of arrangements. For example, in an embodiment where transmission throttling for emission exposure management is implemented with respect to UE transmissions, emission exposure management logic may interact with transmit processor 264 and/or TX MIMO processor 266 of UE 115. In this fashion, the logic (e.g., time averaged transmit power monitoring logic 710 of FIG. 7) can monitor transmit power (e.g., monitoring transmit power with respect to HARQ transmission blocks of one or more HARQ processes). In operation according to embodiments, a time averaged transmit power level (TATPL) may be computed from transmit power of the signals (e.g., HARQ transmission blocks of one or more HARQ processes) transmitted by the UE within the emission exposure rolling average window may be computed. As a specific example, a TATPL computation utilized in accordance with embodiments of the present disclosure may be formulated as Pavg=ΣPi*Ti/T, where Pavg is the average transmission power over the rolling window, T is the length of the rolling window, Pi is the transmit power level, and Ti is the duration of the ith transmission within the rolling window.

Transmission blocks belonging to a plurality of individual communication processes (e.g., a plurality of HARQ processes) may be intertwined within an emission exposure rolling window. So, thus the transmission blocks of a plurality of individual communication processes may contribute to the time averaged transmit power level monitored. Information derived from the foregoing monitoring (e.g., TATPL) may be utilized by the UE for performing transmission throttling with respect to one or more individual communication processes for emission exposure management.

At block 502 of flow 500, emission exposure management logic (e.g., emission exposure limit exceeded determination logic 720 executed by UE 115 and/or emission exposure limit exceeded determination logic 820 executed by base station 105) determines if an emission exposure limit is exceeded. For example, a TATPL value computed at block 501 may be compared to one or more emission exposure level limits (e.g., an emission exposure level limit (EELL) may comprise an emission exposure level limit value for SAR, MPE, a device manufacturer, a network operator, a standards body, etc.) to determine if an emission exposure level limit is exceeded. Such operation may, for example, provide for detection of SAR/MPE, or other emission exposure requirement, violation.

If it is determined that an emission exposure limit is exceeded (e.g., TATPL>EELL), processing according to flow 500 illustrated in FIG. 5 proceeds to block 503 for determining a transmit duty cycle for transmit power control configuration level transmission. For example, emission exposure management logic (e.g., transmit duty cycle determination logic 730 executed by UE 115 and/or transmit duty cycle determination logic 830 executed by base station 105) of embodiments may compute a transmit duty cycle (e.g., maximum transmit duty cycle (MTDC)) for transmission of signals by the UE for one or more wireless communication resource parts within the emission exposure rolling average window that is less than or equal to the one or more emission exposure level limits (e.g., $TATPL_{MTDC} \leq EELL$) while providing transmission of transmission blocks at or near a transmit power control configuration level. In operation according to embodiments, a MTDC may be computed for throttled transmission of HARQ transmission blocks (e.g., transmission of transmission blocks 401, 403, and 405 within a time period of an emission exposure rolling average window) based at least in part in proportion to a percentage by which the time averaged transmit power is to be reduced for meeting an emission exposure limit. For example, where TATPL>EELL, a maximum transmit duty cycle implemented in transmission throttling for emission exposure management according to embodiments may be computed as MTDC=EELL/TATPL when all transmissions involve HARQ transmission blocks.

At block 504 of flow 500 illustrated in FIG. 5, transmit throttling is implemented for transmit power control configuration level transmission based at least in part on monitored time averaged transmit power. For example, based upon the emission exposure limit having been determined to be exceeded by the monitored time averaged transmit power in the emission exposure rolling average window at block 502, emission exposure management logic (e.g., transmit throttling implementation logic 740 executed by UE 115) of embodiments may implement the computed transmit duty cycle (e.g., MTDC computed at block 503) with respect to transmission of signals by the UE.

As an example, the computed transmit duty cycle may be implemented for one or more wireless communication resource parts (e.g., for one or more HARQ processes). This can take place within the emission exposure rolling average window (e.g., transmitting transmission blocks 401 403, and 405 and dropping or skipping transmission of transmission blocks 402 and 404 within a time period of emission exposure rolling average window 410, such as where transmission blocks 402 and 404 comprise retransmission blocks of a same HARQ process). Selection of transmission blocks to be dropped or skipped are selected according to embodiments on a per communication process basis (e.g., HARQ transmission blocks to be dropped are determined for the individual HARQ processes in the emission exposure rolling average window) to reduce the percentage of time transmission blocks (e.g., HARQ transmission blocks for all HARQ processes in the emission exposure rolling average window) are transmitted. Accordingly, implementing transmit throttling of transmission blocks according to embodiments includes skipping one or more retransmissions of transmission blocks of a same hybrid automatic repeat request (HARQ) process.

Referring now to FIG. 6, implementation of transmit throttling in accordance with some embodiments of block 504 is shown. In operation according to the example illustrated in FIG. 6, control is provided at block 601 to skip transmission of at least one transmission block. For example, emission exposure management logic (e.g., as executed by base station 105 and/or UE 115) may provide control signals (e.g., to transmit throttling implementation logic 740 executed by UE 115) for controlling transmit circuitry of the UE (e.g., transmit processor 264) to drop or skip transmission (i.e., not transmit) of some portion of the transmission blocks (e.g., a number of transmission blocks, such as transmission blocks 402 and 404, within each emission exposure rolling window period corresponding to an inactive portion of the determined transmit duty cycle) of a communication process (e.g., HARQ process). The transmission blocks for which transmission is dropped or skipped may be selected from transmission blocks providing retransmission of data (e.g., some portion of the retransmission blocks of one or more HARQ processes).

At block 602 of the embodiment illustrated in FIG. 6, control is provided for controlling transmission of a plurality of transmission blocks at a transmit power control level (i.e., equal to or approximately, such as within 5% or 10% of, the transmit power control level). For example, emission exposure management logic (e.g., as executed by base station 105 and/or UE 115) may provide control signals (e.g., to transmit throttling implementation logic 740 executed by UE 115) for controlling transmit circuitry of UE (e.g., some or all of transmit processor 264, TX MIMO processor 266, MODs 254a-254r, and antennas 252a-252r) to transmit some portion of the transmission blocks (e.g., a number of transmission blocks, such as transmission blocks 401, 403, and 405, within each emission exposure rolling window period corresponding to an active portion of the determined transmit duty cycle) of one or more communication processes (e.g., HARQ processes). The transmission blocks for which transmission is provided may be selected from instances of transmission blocks providing retransmission of data corresponding to that of the dropped or skipped transmission blocks (e.g., although one or more instance of data retransmission in a HARQ process may be skipped, the data may ultimately be retransmitted at a transmit power control level).

Using transmit duty cycle based transmission throttling for emission exposure management according to embodiments, the transmission blocks transmitted in accordance with the duty cycle may be transmitted using transmit power level at or approaching the target TPC power level and nevertheless meeting emission exposure limits (e.g., TATPL$_{MTDC}$≤EELL). In operation according to an exemplary embodiment, for each HARQ process, emission exposure management logic may drop some transmission blocks providing data retransmission to reduce the uplink duty cycle, wherein the drop rate can be a function of how much power backoff would have been had there been no drop (e.g., backoff according to FIG. 3B). After implementing transmit throttling, processing may return to block 501 to continue monitoring time averaged transmit power in the emission exposure rolling average window for detecting if an emission exposure limit is exceeded. Accordingly, embodiments may calculate the time averaged power level for the transmissions subject to TPC, and the emission exposure requirements (e.g., SAR/MPE requirements) according to the new transmit duty cycle.

Referring again to the determination of block 502, if it is determined that an emission exposure limit is not exceeded (e.g., TATPL≤EELL), processing according to flow 500 illustrated in FIG. 5 may return to block 501 (e.g., instead of proceeding to block 503 as discussed above) to continue monitoring time averaged transmit power in the emission exposure rolling average window for detecting if an emission exposure limit is exceeded. In operation according to embodiments, if it is determined at block 502 that an emission exposure limit is not exceeded (e.g., TATPL≤EELL), processing according to flow 500 may optionally proceed to block 505 for determining if transmit throttling is to be adjusted. For example, emission exposure management logic (e.g., as executed by base station 105 and/or UE 115) may compare the TATPL computed at block 501 to one or more EELL values to determine if the TATPL is sufficiently below (e.g., using a threshold value, $T_{EELL}$, to determine if TATPL+$T_{EELL}$<EELL) an emission exposure limit that transmit throttling is to be adjusted (e.g., MTDC increased, transmit throttling stopped, etc.). If it is determined that the time averaged transmit power level is not below (or sufficiently below) the emission exposure limit level to adjust the transmit duty cycle, processing according to the illustrated embodiment may return to block 501 to continue monitoring time averaged transmit power in the emission exposure rolling average window for detecting if an emission exposure limit is exceeded. Alternatively, if it is determined that the time averaged transmit power level is below (or sufficiently below) the emission exposure limit level to adjust the transmit duty cycle, processing according to the illustrated embodiment may proceed to block 503 for determining a new transmit duty cycle for transmit power control configuration level transmission.

The functions of flow 500 shown in FIG. 5 may be performed entirely by UE 115 of some embodiments to provide UE based transmission throttling for emission exposure management. A UE based transmission throttling for emission exposure management implementation may, for example, be preferred for avoiding network traffic overhead used for transmission throttling. However, some portion of the functions of flow 500 may be performed by UE 115 and/or base station 105 to provide UE and base station based transmission throttling for emission exposure management. For example, in a UE and base station based transmission throttling for emission exposure management implementation, UE 115 may operate to perform transmit power monitoring and provide data regarding the monitored transmit power to base station 105. Base station 105 may use the data regarding the monitored transmit power to determine if an emission exposure limit is exceeded and/or to determine a transmit duty cycle for transmit power control configuration level transmission. Base station 105 may provide data regarding determinations made thereby and/or control signals for implementing transmit throttling to UE 115, whereby UE 115 may implement transmit throttling. A UE and base-station based transmission throttling for emission exposure management implementation may, for example, be preferred for reducing computation overhead at the UE used for transmission throttling.

Transmission throttling for emission exposure management implemented according to embodiments of the disclosure provides advantages in addition to meeting one or more emission exposure limit. For example, implementation of the transmit duty cycle wherein the power level of transmission blocks are provided at a higher level (e.g., at or approaching at TPC level) provides improved power amplifier efficiency (e.g., due to transmission activity throttling rather than transmit power level backoff) and increased battery life (e.g., less failed transmission attempts by a battery powered UE). Moreover, embodiments of transmission throttling for emission exposure management herein provide rapid response to emission exposure limits (e.g., SAR/MPE violations) in light of transmit throttling being implemented at the physical layer (e.g., avoiding latency and implementation errors). Further, embodiments of transmission throttling for emission exposure management implemented in accordance with concepts herein provides precise throttling (e.g., meeting a particular emission exposure limit while transmitting at power levels such as TPC levels) with respect to signal transmission.

Example embodiments implementing transmission throttling for emission exposure management have been described herein with respect to UE uplink transmissions. It should be appreciated, however, that concepts of the present disclosure may be utilized with respect to various transmission scenarios in addition to or in the alternative to the implementations of the example embodiments.

Embodiments of transmission throttling for emission exposure management have been described herein with respect to implementing a transmit duty cycle for transmit power control configuration level transmission. Concepts of the present disclosure may, however, be utilized to provide duty cycle based transmission throttling in combination with other techniques. For example, transmit duty cycle based transmission throttling for emission exposure management may be implemented in combination with antenna element feed path component management, such as shown and described in U.S. provisional patent application Ser. No. 62/684,101 entitled "Antenna Element Feed Path Component Management for 5G-NR Millimeter Wave Communication," filed Jun. 12, 2018, the disclosure of which is hereby incorporated herein by reference.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 5 and 6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmission throttling for emission exposure management in wireless communication, the method comprising:
monitoring, by emission exposure management logic of one or more processor-based wireless communication devices, a time averaged power level of transmission of the plurality of transmission blocks in an emission exposure rolling average window; and
implementing, by the emission exposure management logic of the one or more processor-based wireless communication devices, transmit throttling of transmission blocks based at least in part on the monitored time averaged power level for transmissions, via skipping one or more retransmissions of transmission blocks of a hybrid automatic repeat request (HARQ) process.

2. The method of claim 1, further comprising:
determining, by the emission exposure management logic of the one or more processor-based wireless communication devices, transmission blocks for skipping re-transmission on a per HARQ process basis for one or more HARQ processes with retransmission blocks in the emission exposure rolling average window.

3. The method of claim 2, wherein the transmission blocks determined for skipping retransmission comprise transmission blocks of a same HARQ process.

4. The method of claim 1, further comprising:
implementing the transmit throttling of transmission blocks using a transmit duty cycle determined for a transmit power control configuration level transmission.

5. The method of claim 1, further comprising:
computing, by the emission exposure management logic of the one or more processor-based wireless communication devices, a transmit duty cycle for transmission of transmission blocks of a communication process within the emission exposure rolling average window that has time averaged transmit power level less than or equal to an emission exposure level limit.

6. The method of claim 5, further comprising:
determining if a target emission exposure level is exceeded by a level of the monitored time averaged transmit power, wherein the transmit throttling of transmission blocks is determined based at least in part on the level of the monitored time averaged transmit power and the target emission exposure level and the transmit duty cycle is computed based at least in part in proportion to a percentage by which time averaged transmit power is to be reduced for transmission of the plurality of transmission blocks over the emission exposure rolling average window being less than or equal to the target emission exposure level.

7. The method of claim 1, further comprising:
controlling, by the emission exposure management logic of the one or more processor-based wireless communication devices, transmission of a plurality of transmission blocks to be transmitted at a transmit power control level of the transmit power control configuration.

8. A non-transitory computer-readable medium having program code recorded thereon for transmission throttling for emission exposure management in wireless communication, the program code comprising:
program code executable by a computer for causing the computer to:
monitor, by emission exposure management logic of one or more processor-based wireless communication devices, a time averaged power level of transmission of the plurality of transmission blocks in an emission exposure rolling average window; and
implement, by the emission exposure management logic of the one or more processor-based wireless communication devices, transmit throttling of transmission blocks based at least in part on the monitored time averaged power level for transmissions, via skipping one or more retransmissions of transmission blocks of a hybrid automatic repeat request (HARQ) process.

9. The non-transitory computer-readable medium of claim 8, further comprising program code for causing the computer to:
determine, by the emission exposure management logic of the one or more processor-based wireless communication devices, transmission blocks for skipping re-transmission on a per HARQ process basis for one or more HARQ processes with retransmission blocks in the emission exposure rolling average window.

10. The non-transitory computer-readable medium of claim 9, wherein the transmission blocks determined for skipping retransmission comprise transmission blocks of a same HARQ process.

11. The non-transitory computer-readable medium of claim 9, further comprising program code for causing the computer to:
implement the transmit throttling of transmission blocks using a transmit duty cycle determined for a transmit power control configuration level transmission.

12. The non-transitory computer-readable medium of claim 11, further comprising program code for causing the computer to:
compute, by the emission exposure management logic of the one or more processor-based wireless communication devices, a transmit duty cycle for transmission of transmission blocks of a communication process within the emission exposure rolling average window that has time averaged transmit power level less than or equal to an emission exposure level limit.

13. The non-transitory computer-readable medium of claim 12, further comprising program code for causing the computer to:
determine if a target emission exposure level is exceeded by a level of the monitored time averaged transmit power, wherein the transmit throttling of transmission blocks is determined based at least in part on the level of the monitored time averaged transmit power and the target emission exposure level and the transmit duty cycle is computed based at least in part in proportion to a percentage by which time averaged transmit power is to be reduced for transmission of the plurality of transmission blocks over the emission exposure rolling average window being less than or equal to the target emission exposure level.

14. The non-transitory computer-readable medium of claim 11, further comprising program code for causing the computer to:
control, by the emission exposure management logic of the one or more processor-based wireless communication devices, transmission of a plurality of transmission blocks to be transmitted at a transmit power control level of the transmit power control configuration.

15. An apparatus configured for throttling for emission exposure management in wireless communication, the apparatus comprising:
at least one processor; and
a memory coupled to the at least one processor, wherein the at least one processor is configured:
to monitor a time averaged power level of transmission of the plurality of transmission blocks in an emission exposure rolling average window; and
implement transmit throttling of transmission blocks based at least in part on the monitored time averaged power level for transmissions, via skipping one or more retransmissions of transmission blocks of a hybrid automatic repeat request (HARQ) process.

16. The apparatus of claim 15, wherein the at least one processor is further configured:
to determine transmission blocks for skipping re-transmission on a per HARQ process basis for one or more HARQ processes with retransmission blocks in the emission exposure rolling average window.

17. The apparatus of claim 16, wherein the transmission blocks determined for skipping retransmission comprise transmission blocks of a same HARQ process.

18. The apparatus of claim 15, wherein the at least one processor is further configured:
to implement the transmit throttling of transmission blocks using a transmit duty cycle determined for a transmit power control configuration level transmission.

19. The apparatus of claim 18, wherein the at least one processor is further configured:
to compute a transmit duty cycle for transmission of transmission blocks of a communication process within the emission exposure rolling average window that has time averaged transmit power level less than or equal to an emission exposure level limit.

20. The apparatus of claim 19, wherein the at least one processor is further configured:
to determine if a target emission exposure level is exceeded by a level of the monitored time averaged transmit power, wherein the transmit throttling of transmission blocks is determined based at least in part on the level of the monitored time averaged transmit power and the target emission exposure level and the transmit duty cycle is computed based at least in part in proportion to a percentage by which time averaged transmit power is to be reduced for transmission of the plurality of transmission blocks over the emission exposure rolling average window being less than or equal to the target emission exposure level.

21. The apparatus of claim 18, wherein the at least one processor is further configured:
to control, by the emission exposure management logic of the one or more processor-based wireless communication devices, transmission of a plurality of transmission blocks to be transmitted at a transmit power control level of the transmit power control configuration.

* * * * *